US006844150B2

(12) United States Patent
Weiss et al.

(10) Patent No.: US 6,844,150 B2
(45) Date of Patent: Jan. 18, 2005

(54) ULTRAHIGH RESOLUTION MULTICOLOR COLOCALIZATION OF SINGLE FLUORESCENT PROBES

(75) Inventors: Shimon Weiss, Los Angeles, CA (US); Xavier Michalet, Berkeley, CA (US); Thilo D. Lacoste, Tuebingen (DE)

(73) Assignee: The Regents of the University of California, Oakland, CA (US)

( * ) Notice: Subject to any disclaimer, the term of this patent is extended or adjusted under 35 U.S.C. 154(b) by 576 days.

(21) Appl. No.: 09/925,100

(22) Filed: Aug. 8, 2001

(65) Prior Publication Data

US 2002/0064789 A1 May 30, 2002

Related U.S. Application Data (60) Provisional application No. 60/228,107, filed on Aug. 24, 2000.

(51) Int. Cl.[7] ............................. C12Q 1/00; C12Q 1/68; G01N 1/00; G01N 15/00
(52) U.S. Cl. ................................ 435/4; 435/6; 422/50; 422/68.1; 422/82.05; 422/82.08
(58) Field of Search ........................... 435/4, 6; 422/50, 422/68.1, 82.05, 82.08

(56) References Cited

PUBLICATIONS

Xie, X.S. & Trautman, J.K. (1998) *Ann. Rev. Phys. Chem.* 49, 441–480.
Moerner, W.E. & Orrit, M. (1999) *Science* 283, 1670–6.
Weiss, S. (1999) *Science* 283, 1676–83.
Schütz, G.J. Pastushenko, V.P., Gruber, H.J., Knaus, H.–G., Pragl, B. & Schindler, H. (2000) *Single Mol.* 1, 25–31.
Schütz, G.J., Pastushenko, V.P., Gruber, H.J., Knaus, H.–G., Pragl, B. & Schindler, H. (2000) *Single Mol.* 1, 25–31.
Sako, Y., Minoguchi, S. & Yanagida, T. (2000) *Nature Cell Biol.* 2, 168–72.
Carrington, W.A., Lynch, R.M., Moore, E.D. W., Isenberg, G., Fogarty, K.E. & Fay, F.S. (1995) *Science* 268, 1483–1487.
Schmidt, T., Schütz, G.J., Baumgartner, W., Gruber, H.J. & Schindler, H. (1996) *Proc. Natl. Acad. Sci. USA.* 93, 2926–2929.
Schütz, G.J., Schindler, H. & Schmidt, T. (1997) *Bioph. J.* 73, 1073–1080.
Dickson, R.M., Norris, D.J., Tzeng, Y.L., Moerner, W.E. (1996) *Science* 274, 966–969.
Dunn, R.C. (1999) *Chem. Rev.* 99, 2891–2927.
Sanchez, E.J., Novotny, L. & Sunney Xie, X. (1999) *Phys. Rev. Lett.* 82, 4014–17.
Hell, S. & Stelzer, E.H.K. (1992) *J. Opt. Soc. Am. A* 9, 2159–2166.
Gustafsson, M.G.L., Agard, D.A. & Sedat, J.W. (1999) *J. Micsosc.* 195, 10–16.
Klar, T.A. & Hell, S.W. (1999) *Opt. Lett.* 24, 954–956.

(List continued on next page.)

Primary Examiner—Ardin H. Marschel
(74) Attorney, Agent, or Firm—Shapiro & Dupont LLP (57) ABSTRACT

A novel optical ruler based on ultrahigh-resolution colocalization of single fluorescent probes is described. Two unique families of fluorophores are used, namely energy-transfer fluorescent beads and semiconductor nanocrystal (NC) quantum dots, that can be excited by a single laser wavelength but emit at different wavelengths. A novel multicolor sample-scanning confocal microscope was constructed which allows one to image each fluorescent light emitter, free of chromatic aberrations, by scanning the sample with nanometer scale steps using a piezo-scanner. The resulting spots are accurately localized by fitting them to the known shape of the excitation point-spread-function of the microscope.

26 Claims, 5 Drawing Sheets

OTHER PUBLICATIONS

Enderle, T., Ha., T., Ogletree, D.F., Chemla, D.S., Magowan, C. & Weiss, S. (1997) *Proc. Natl. Acad. Sci. USA.* 94, 520–525.

Patwardham, A. & Manders, E.M.M. (1996) *Bioimaging* 4, 17–24.

Manders, E.M.M. (1997) *J. Microsc.* 185, 321–8.

Scalettar, B.A., Swedlow, J.R., Sedat, J.W. & Agard, D.A. (1996) *J. Miscosc.* 182, 50–60.

Burns, D.H., Callis, J.B., Christian, G.D. & Davidson, E.R. (1985) *Appl. Opt.* 24, 154–161.

Betzig, E. (1995) *Opt. Lett.* 20, 237–239.

Bruchez, M.J., Moronne, M.M., Gin, P., Weiss, S. & Alivisatos, P.A. (1998) *Science* 281, 2013–16.

Chan, W.C.W. & Nie, S. (1998) *Science* 281, 2016–18.

van Oijen, A.M., Köhler, J., Schmidt, J., Müller, M. & Brakenhoff, G.J. (1998) *Chem. Phys. Lett.* 292, 183–187.

Enderle, T., Ha, T., Chemla, D.S. & Weiss, S. (1998) *Ultramicroscopy* 71, 303.

Ha, T., Enderle, T., Chemla, D.S. & Weiss, S. (1996) *IEEE J. Quantum Elec.* 2 1115–1128.

Alivisatos, A.P. (1996) *Science* 271, 933–937.

Peng, X.G., Schlamp, M.C., Kadavanich, A.V. & Alivisatos, A.P. (1997) *J. Am. Chem. Soc.* 119, 7019–7029.

Press, W.H., Teukolsky, S.A., Vetterling, W.T. & Flannery, B.P. (1996) *Numerical Recipes in C. The Art of Scientific Computing.* (Cambridge University Press).

Efron, B., Tibshirani, R.J. & Efron, B. (1994) *An Introduction to the Bootstrap* (CRC Press).

Nirmal, M., Dabbousi, B.O., Bawendi, M.G., Macklin, J.J., Trautman, J.K., Harris, T.D. & Brus, L.E. (1996) *Nature* 383, 802–804.

Efros, A.L. & Rosen, M. (1997) *Phys. Rev. Lett.* 78, 1110–13.

Banin, U., Bruchez, M., Alivisatos, A.P., Ha, T., Weiss, S. & Chemla, D.S. (1999) *J. Chem. Phys.* 10, 1–7.

Kuno, M., Fromm, D.P., Hamann, H.F., Gallagher, A. & Nesbitt, D.J. (2000) *J. Chem. Phys.* 112, 3117–3120.

Ju, J., Ruan, C., Fuller, C.W., Glazer, A.N. & Mathies, R.A. (1995) *Proc. Natl. Acad. Sci. USA.* 92, 4347–431.

Cogswell, C.J. & Larkin, K.G. (1995) in *Handbook of Biological Confocal Microscopy*, ed. Pawley, J.B. (Plenum Press, New York), pp. 127–137.

Bobroff, N. (1986) *Rev. Sci. Instr.* 57, 1152–1157.

Shaw, P.J. & Rawlins, D.J. (1991) *J. Microsc.* 163, 151–165.

Gibson, S.F. & Lanni, F. (1989) *J. Opt. Soc. Am. A* 6, 1357–1367.

ULTRAHIGH RESOLUTION MULTICOLOR COLOCALIZATION OF SINGLE FLUORESCENT PROBES

CROSS REFERENCE TO RELATED APPLICATIONS

This application claims priority to U.S. Ser. No. 60/228,107, filed Aug. 24, 2000, the contents of which are incorporated herein in their entirety.

STATEMENT REGARDING FEDERALLY SPONSORED RESEARCH OR DEVELOPMENT

This invention was made with government support under Grant (Contract) No. DE-AC03-76F00098 awarded by The United States Department of Energy. The government has certain rights to this invention.

BACKGROUND OF THE INVENTION

Following the completion of the human genome project, the cataloging of all gene sequences and the acquisition of high-resolution structures of proteins and RNAs, future biological investigations will focus on how the fundamental cellular building blocks interact with each other. Another important issue will be to determine their precise locations in space and time in an attempt to decode and lay out the cell machinery and circuitry. Indeed, many vital functions of the cell are performed by highly organized structures, modular cellular machines that are self-assembled from a large number of interacting macromolecules, and translocated from one cell compartment to another. To unravel the organization and dynamics of these molecular machines in the cell, a tool is needed that can provide dynamic, in vivo, 3D microscopic pictures with nanometer resolution of individual molecules interacting with each other.

Fluorescence microscopy can provide exquisite sensitivity down to the single molecule level for in vitro experiments (1-3). Moreover, it has recently been shown that single fluorophores can be detected in the membrane of living cells with good signal-to-noise ratio (S/N) (4-6). What is not clear yet is whether single molecule fluorescence microscopy can provide the desired spatial and temporal resolution. Technical challenges still to be met are (i) the synthesis of spectrally resolvable, bright and stable fluorophores that can be coupled in vivo to macromolecules; (ii) the development of an easy-to-use and affordable instrument which permits high-resolution localization of individual point-like sources in 3D; and (iii) the ability to perform such measurements at a rate which is compatible with that of biological events. The invention contemplated herein provides an effective solution to the above stated problems.

References.

The following references are used to explain and describe the prior art and the invention. The contents of the references are hereby incorporated by reference in their entirety.

1. Xie, X. S. & Trautman, J. K. (1998) *Ann. Rev. Phys. Chem.* 49,441–480.
2. Moerner, W. E. & Orrit, M. (1999) *Science* 283, 1670–6.
3. Weiss, S. (1999) *Science* 283, 1676–83.
4. Schütz, G. J., Pastushenko, V. P., Gruber, H. J., Knaus, H.-G., Pragl, B. & Schindler, H. (2000) *Single Mol.* 1, 25–31.
5. Schütz, G. J., Kada, G., Pastushenko, V. P. & Schindler, H. (2000) *EMBO J.* 19, 892–901.
6. Sako, Y., Minoguchi, S. & Yanagida, T. (2000) *Nature Cell Biol.* 2, 168–72.
7. Carrington, W. A., Lynch, R. M., Moore, E. D. W., Isenberg, G., Fogarty, K. E. & Fay, F. S. (1995) *Science* 268, 1483–1487.
8. Schmidt, T., Schütz, G. J., Baumgartner, W., Gruber, H. J. & Schindler, H. (1996) *Proc. Natl. Acad. Sci. USA*. 93, 2926–2929.
9. Schütz, G. J., Schindler, H. & Schmidt, T. (1997) *Bioph. J.* 73, 1073–1080.
10. Dickson, R. M., Norris, D. J., Tzeng, Y. L., Moerner, W. E. (1996) *Science* 274, 966–969.
11. Dunn, R. C. (1999) *Chem. Rev.* 99, 2891–2927.
12. Sanchez, E. J., Novotny, L. & Sunney Xie, X. (1999) *Phys. Rev. Lett.* 82,4014–17.
13. Hell, S. & Stelzer, E. H. K. (1992) *J. Opt. Soc. Am. A* 9, 2159–2166.
14. Gustafsson, M. G. L., Agard, D. A. & Sedat, J. W. (1999) *J. Microsc.* 195, 10–16.
15. Klar, T. A. & Hell, S. W. (1999) *Opt. Lett.* 24,954–956.
16. Klar, T. A., Jakobs, S., Dyba, M., Enger, A. & Hell, S. W. (2000) submitted for publication.
17. Enderle, T., Ha, T., Ogletree, D. F., Chemla, D. S., Magowan, C. & Weiss, S. (1997) *Proc. Natl. Acad. Sci. USA*. 94, 520–525.
18. Patwardhan, A. & Manders, E. M. M. (1996) *Bioimaging* 4, 17–24.
19. Manders, E. M. M. (1997) *J. Microsc.* 185, 321–8.
20. Scalettar, B. A., Swedlow, J. R., Sedat, J. W. & Agard, D. A. (1996) *J. Microsc.* 182,50–60.
21. Burns, D. H., Callis, J. B., Christian, G. D. & Davidson, E. R. (1985) *Appl. Opt.* 24, 154–161.
22. Betzig, E. (1995) *Opt. Lett.* 20,237–239.
23. Bruchez, M. J., Moronne, M. M., Gin, P., Weiss, S. & Alivisatos, P. A. (1998) *Science* 281, 2013–16.
24. Chan, W. C. W. & Nie, S. (1998) *Science* 281, 2016–18.
25. van Oijen, A. M., Köhler, J., Schmidt, J., Müller, M. & Brakenhoff, G. J. (1998) *Chem. Phys. Lett.* 292, 183–187.
26. Enderle, T., Ha, T., Chemla, D. S. & Weiss, S. (1998) *Ultramicroscopy* 71, 303.
27. Ha, T., Enderle, T., Chemla, D. S. & Weiss, S. (1996) *IEEE J. Quantum Elec.* 2, 1115–1128.
28. Alivisatos, A. P. (1996) *Science* 271, 933–937.
29. Peng, X. G., Schlamp, M. C., Kadavanich, A. V. & Alivisatos, A. P. (1997) *J. Am. Chem. Soc.* 119, 7019–7029.
30. Press, W. H., Teukolsky, S. A., Vetterling, W. T. & Flannery, B. P. (1996) *Numerical Recipes in C. The Art of Scientific Computing.* (Cambridge University Press.
31. Efron, B., Tibshirani, R. J. & Efron, B. (1994) *An Introduction to the Bootstrap* (CRC Press.
32. Nirmal, M., Dabbousi, B. O., Bawendi, M. G., Macklin, J. J., Trautman, J. K., Harris, T. D. & Brus, L. E. (1996) *Nature* 383, 802–804.
33. Efros, A. L. & Rosen, M. (1997) *Phys. Rev. Lett.* 78, 1110–13.
34. Banin, U., Bruchez, M., Alivisatos, A. P., Ha, T., Weiss, S. & Chemla, D. S. (1999) *J. Chem. Phys.* 10, 1–7.
35. Kuno, M., Fromm, D. P., Hamann, H. F., Gallagher, A. & Nesbitt, D. J. (2000) *J. Chem. Phys.* 112, 3117–3120.
36. Ju, J., Ruan, C., Fuller, C. W., Glazer, A. N. & Mathies, R. A. (1995) *Proc. Natl. Acad. Sci. USA*. 92,4347–431.
37. Cogswell, C. J. & Larkin, K. G. (1995) in *Handbook of Biological Confocal Microscopy*, ed. Pawley, J. B. (Plenum Press, New York), pp. 127–137.
38. Bobroff, N. (1986) *Rev. Sci. Instr.* 57, 1152–1157.
39. Efros, A. L. (2000) private communication.
40. Shaw, P. J. & Rawlins, D. J. (1991) *J. Microsc.* 163, 151–165.
41. Gibson, S. F. & Lanni, F. (1989) *J. Opt. Soc. Am. A* 6, 1357–1367.
42. Dahan, M., Laurence, T., Pinaud, F., Herten, D. P., Schumacher, A., Chemla, D. S., Alivisatos, A. P., Sauer, M. & Weiss, S. (in preparation).

Abbreviations used herein include: APD, avalanche photodiode; CL, confidence limit; CLPS, closed-loop piezo-scanner; cpp, count-per-pixel; ICCD, intensified charge-coupled device; NC, nanocrystal; PD, probability distribution; PSF, point-spread function; S/N, signal-to-noise ratio; UHRC, ultra-high-resolution colocalization; TFS, TransFluoSphere, 2D, two-dimensional; 3D, three-dimensional; NSOM, near-field scanning optical microscopy; FWHM, full-width half-maxium.

BRIEF SUMMARY OF THE INVENTION

Recently, significant advances have been made in improving the spatial resolution of optical microscopy beyond the classical diffraction limit of light. These include: (i) wide-field image restoration by computational methods (deconvolution) (7); (ii) wide-field single molecule localization and tracking (8–10); (iii) aperture (11) and apertureless type (12) near-field scanning optical microscopy (NSOM); (iv) 4PI (13) and $I^5M$ (14) microscopies; and (v) point-spread-function (PSF) engineering by stimulated emission depletion (STED) (15, 16). While opening new frontiers in microscopy, each of these methods has particular limitations. For example, deconvolution algorithms do not have unique solutions, require subsequent signal processing, and have limited ability to compensate for aberrations. NSOM is limited to surfaces (such as cell membranes) (17). Moreover, it is very demanding to operate and difficult to implement for hydrated samples. 4PI and $I^5M$ microscopies require accurate alignment of two objectives, phase control of counter-propagating beams, signal post-processing, and put constraints on sample size. PSF engineering by STED requires an ultra-fast oscillator and amplifier system, and is not easily expandable to multicolor probes. More generally, aside from NSOM, these super-resolution approaches still suffer from basic limitations of far-field optics, i.e. spherical and chromatic aberrations that can never be fully corrected for all wavelengths, and all have to tackle with the registration of separately acquired color planes.

Several attempts to correct or circumvent these difficulties have been reported. For confocal microscopy, Patwardhan (18) and Manders (19) addressed chromatic aberrations in the excitation arm. Manders also addressed chromatic aberrations in the detection arm by using multi-labeled ('white') microbeads to measure the positional shifts between three different detection channels generated by chromatic aberrations. Scalettar et al. (20) took a similar approach to improve resolution in wide-field microscopy by using measured wavelength-dependent spherical aberrations as constraints for a deconvolution algorithm. However, none of these approaches perfectly corrects these imperfections.

BRIEF DESCRIPTION OF THE FIGURES

FIG. 2a depicts a representative collection of individual NC spectra (about 20 nm FWHM) obtained from the integrated data of 3×3 pixels.

FIG. 2b depicts five false-color images corresponding to the spectral bands defined in FIG. 2a.

FIG. 2c is an overlay of the five perfectly registered images of FIG. 2b.

DETAILED DESCRIPTION OF THE PREFERRED EMBODIMENTS

The instant invention contemplates a method for the colocalization of two or more species of interest in a sample comprising:
  a) exciting the species of interest with a single wavelength of light thereby causing the two or more species of interest to emit light of a distinctive emission characteristic,
  b) separating the distinctive emission characteristics of the two or more species of interest,
  c) detecting the emitted light from the two or more species of interest,
  d) moving the sample a predetermined distance,
  e) repeating steps a) through d) a predetermined number of times thereby creating a multitude of representations of the excitation point spread function (PSF),
  f) determine the geometric center of the representations of the excitation PSF for at least two of the species of interest,
  g) computing the distance between the geometric centers of the representations of the excitation PSF for the species of interest.

The detection of the emitted light from the two or more species may be accomplished either simultaneously or sequentially. The excitation of the species of interest may be accomplished using a laser. The excitation of the species may be a single photon process or a multi-photon process.

Also contemplated by the instant invention is a method for identifying fluorophores comprising: a) exciting the species of interest with a single wavelength of light thereby causing the two or more species of interest to emit light of a distinctive emission characteristic,
  b) separating the distinctive emission characteristics of the two or more species of interest,
  c) detecting the emitted light from the two or more species of interest,
  d) moving the sample a predetermined distance,
  e) repeating steps a) through d) a predetermined number of times thereby creating a multitude of representations of the excitation point spread function (PSF),
  f) determine the geometric center of the representations of the excitation PSF for at least two of the species of interest,
  g) computing the distance between the geometric centers of the representations of the excitation PSF for the species of interest.

Also contemplated by the instant invention is an apparatus for the colocalization of two or more species of interest in a sample comprising:
- a scanner capable of supporting a sample and moving the sample,
- a single wavelength light source capable of exciting the sample,
- a device capable of separating the respective distinctive emission characteristics of the two or more species of interest,
- a device capable of detecting the emitted light from the two or more species of interest.

The invention contemplated herein is a novel technique providing an imaging and ultrahigh-resolution colocalization technique that can pinpoint the location of multiple distinguishable probes with nanometer accuracy and perfect registry.

By the term colocalization it is meant the identification and/or measurement of the respective positions of two different objects having two different characteristics. For example, spectral characteristics can be determined using optical methods.

The invention contemplated herein is not limited to biological applications. It is also useful in the field of nanotechnology.

By the term species of interest it is meant to include compounds, molecules, mixtures of all types found both in vivo or in vitro media. This also includes probes, fluorescent or otherwise, that are bonded, adhered or mixed with a compound, molecule or mixture.

TFS's and NC's used herein are merely exemplary. The invention contemplates that any species capable of exhibiting fluorescence, raman scattering or hyper raman for both stokes or anti stokes is suitable.

It is to be understood that the present method can be used alone or in conjunction with known methods of optically analyzing fluorescence of fluorophores to determine the presende of fluorophores.

The term fluorophore is given that meaning commonly used in the art.

Fluorescent probes using nanocrystals are known in the art and are described in U.S. Pat. No. 5,990,479, the contents of which are hereby incorporated by reference in their entirety.

By "separation by lifetime" or "fluorescence lifetime" it is meant separation by photon arrival time after excitation.

By "polarization" or "separation by polarization" it is meant separation by orientation of the electrical vector field or absorbtion/emission transition dipole moment.

By "single photon process" it is meant a process whereby the transition of the nonexcited state to the excited state occur by absorbtion of a single photon.

By "multi-photon process" or "multiple photon process" it is meant a process whereby the transition of the nonexcited state to the excited state occur by simultaneous absorbtion of two or more photons.

This method is based on sample-scanning confocal microscopy using a single laser excitation wavelength and a closed-loop piezo-scanner (CLPS) that allows nanometer accuracy steps. In this design, each fluorescent probe is moved through the fixed electromagnetic field at the focal point of the objective lens, which is a diffraction-limited intensity distribution known as the point-spread-function (PSF). A pixel-by-pixel map (image) of the excitation PSF is then built from the recorded fluorescence intensity of this probe. Second, the method takes advantage of point-like fluorescent probes (i.e. much smaller than their emission wavelength) that can all be excited by the same laser wavelength but differ in their emission properties (21, 22). The fluorescence of the different emitters needs to be separable or recorded independently in 'orthogonal' channels. This separation can be based on differences in emission color, fluorescence lifetime, or any other photophysical characteristics. Examples of such point-like probes that were used in this study are small TRANSFLUOSPHERES (TM) (TFS) beads (Molecular Probes, 40 nm diameter) or semiconductor nanocrystal (NC) quantum dots (less than 10 nm diameter) (23, 24). Since all probes are excited by the same laser, aligned on the optical axis, the effects of chromatic aberrations in the excitation path are altogether eliminated. This fixed-excitation scheme also ensures the equivalence of each channel in the detection path. As the sample consisting of these distinguishable probes is scanned through the excitation PSF, images are constructed pixel-by-pixel from the recorded signal of each channel. In these images, all pixels corresponding to a given nanometer-accurate scanner position are in perfect registry. Each individual point-like source will appear in one channel only as a diffraction-limited shape, identical to that of the excitation PSF.

The resulting PSF images are fitted to a 2D Gaussian function, a good approximation of the theoretical shape of the PSF. This allows one to localize their centers with a precision of a few nanometers, limited only by shot noise, photophysical noise of the fluorescence signal (triplet states, blinking, photobleaching), and electronic and mechanical noise of the piezo-scanning device. The distance of fluorescent emitters recorded in orthogonal channels can thus be determined with nanometer accuracy, a result termed ultrahigh-resolution colocalization (UHRC). The physical size of the probes is the lower boundary of the distance measurement; the upper boundary is given by the scan range of the piezo-scanner (here, 100 $\mu$m).

A related technique using a single excitation beam (22) was recently demonstrated by van Oijen et al. (25) for pentacene molecules embedded in a p-terphenyl host crystal at cryogenic temperature relying on differences in absorption peaks among molecules and using wide-field imaging. Known in the art is a related colocalization scheme of two different-color dyes using NSOM that forced two different-wavelength excitation lasers through the same near-field aperture (thus ensuring overlapping excitation volumes). This scheme was used to colocalize malaria parasite proteins in the membrane of infected red blood cells (17, 26, 27).

The invention contemplated herein, which utilizes far-field optical components only and a single laser wavelength, dramatically extends the application range of UHRC. In particular, it allows 3D scanning and multicolor imaging, opening the way to in vivo nanometer-resolution mapping and tracking of multiple cellular components.

Figure 1:
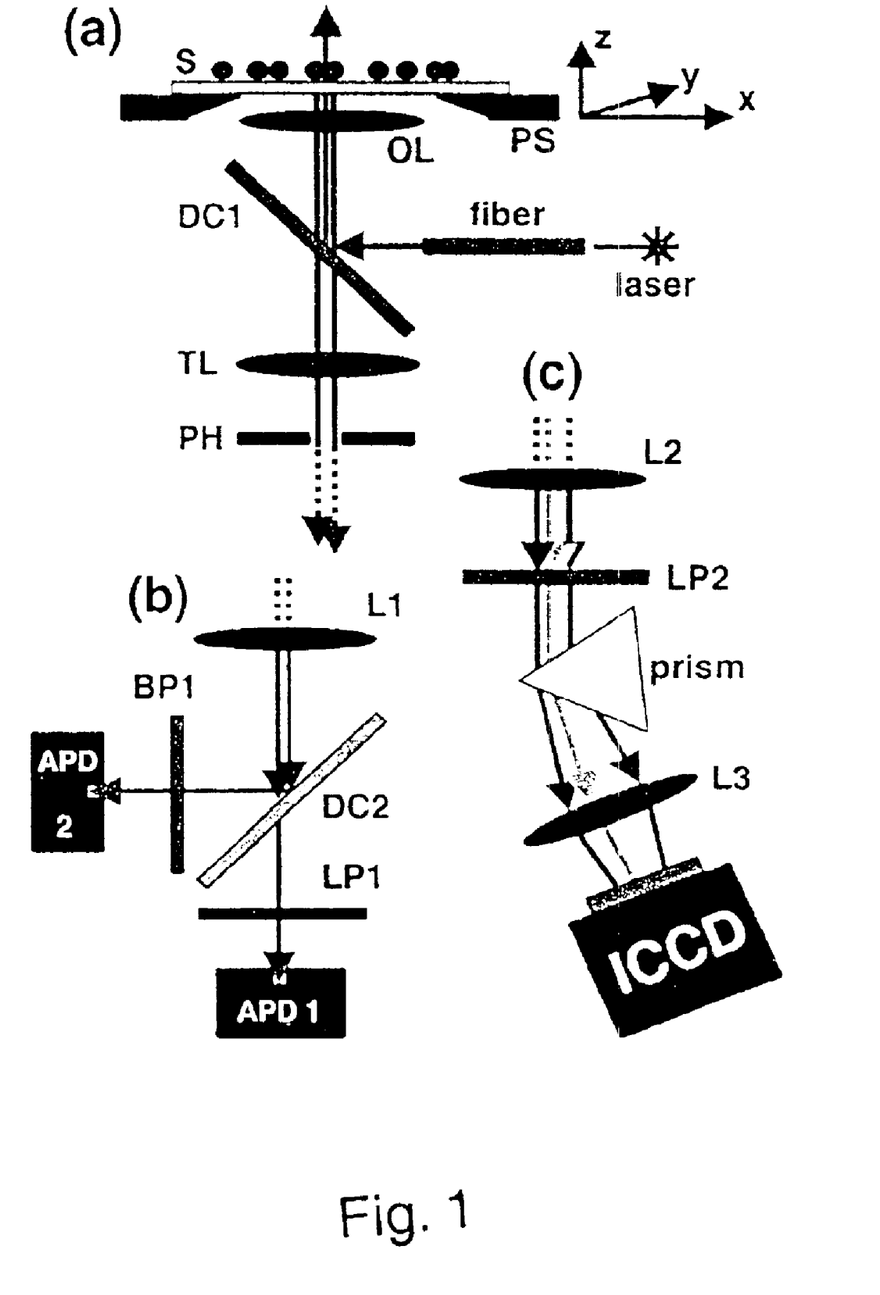
FIG. 1a is an example of an optical setup of a preferred multicolor sample-scanning confocal microscope: an excitation arm.
FIG. 1b is an optical setup of a sample multicolor sample-scanning confocal microscope: detection arm of the Axioskop.
FIG. 1c is an optical setup of a sample multicolor sample-scanning confocal microscope: detection arm of the Axiovert.

FIG. 1 depicts an optical setup of the multicolor sample-scanning confocal microscope. (a) Excitation arm: laser excitation guided through a single-mode fiber is reflected by a dichroic mirror (DC1) and focussed through an infinity-corrected objective lens (OL) onto the sample (S), which is mounted on a 3D piezo-scanner (PS). A real image of the fluorescence response of this focal spot is formed in the plane of an adjustable pinhole (PH, 630 $\mu$m diameter) used for background rejection. (b) Detection arm of the Axioskop (dual-color): fluorescence light originating from PH is split by a dichroic mirror (DC2), filtered by a bandpass (BP) or a longpass (LP1), also rejecting the excitation wavelength. A lens (L1) in a 2f—2f configuration is used to focus the light onto two independently adjustable APDs. Their small sensitive areas (200 $\mu$m diameter) function as confocal pinholes. (c) Detection arm of the Axiovert (multicolor): the fluorescence light originating from the pinhole plane is collimated by a lens (L2), long pass filtered (LP2), dispersed by a prism and imaged through another lens (L3) onto an ICCD camera. A full emission spectrum is acquired for each scanned pixel. Nanocrystals (NC) multicolor imaging.

Figure 2:
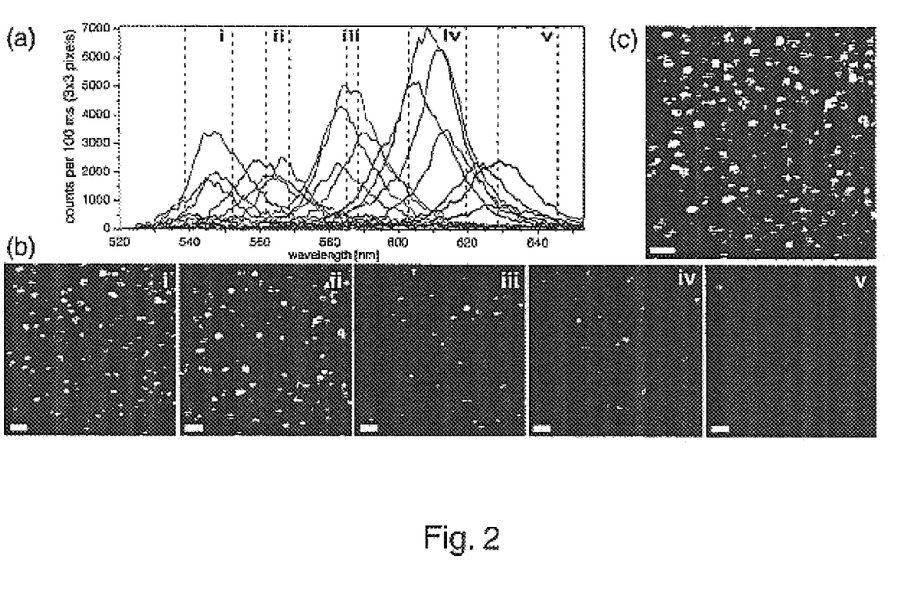

FIG. 2 depicts scans of a mixture of four NC samples (ensemble peak emissions: 540, 575, 588 and 620 nm). (a–c): 10×10 $\mu m^2$ scan (pixel size: 78 nm, scale bar: 1 $\mu$m). (a) A representative collection of individual NC spectra (about 20 nm FWHM) obtained from the integrated data of 3×3 pixels. Despite their overlap, five 'orthogonal' spectral bands (i to v) could be defined. (b) Five false-color images corresponding to the spectral bands defined in (a). (c) Overlay of the five perfectly registered images of (b).

Figure 3:
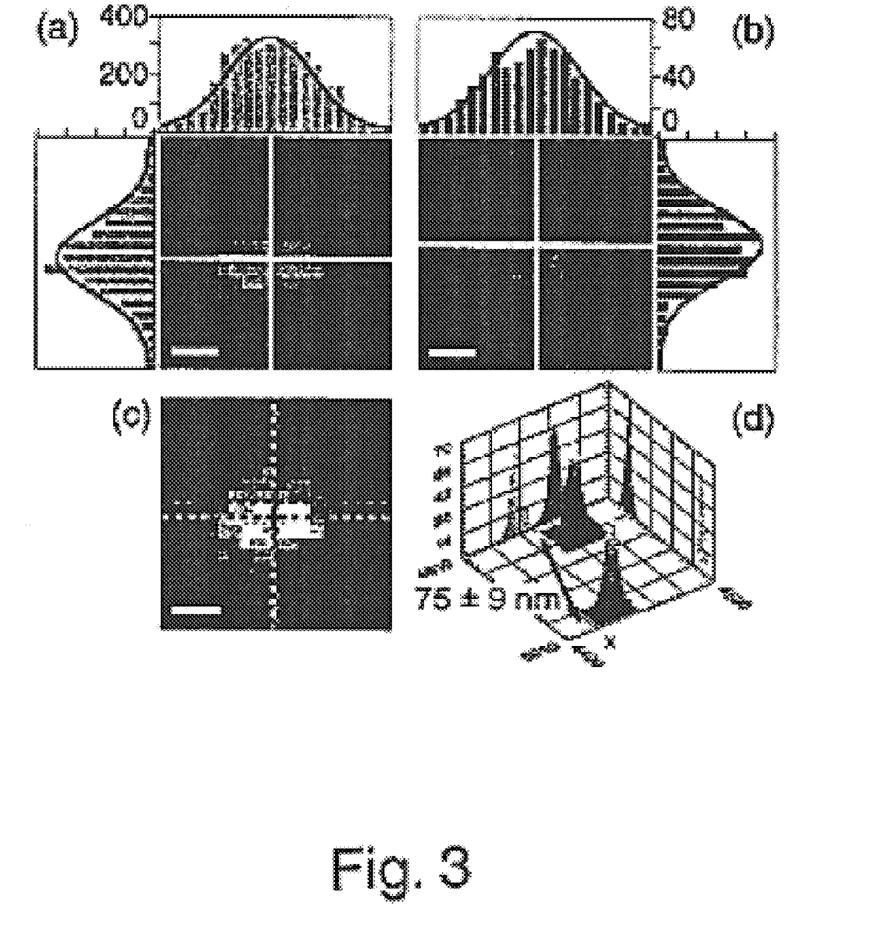
FIG. 3a and FIG. 3b depict green and red channel images of a 1×1 $\mu m^2$.
FIG. 3c is an overlay of the two channels.
FIG. 3d is a histogram of the fitted centers of 100 bootstrap simulations of each channel.

FIG. 3 shows TRANSFLUOSPHERES (TM) colocalization. Mixture of green (Em: 560 nm) and red (Em: 685 nm) TFSs excited at 488 nm (excitation power: 50 nW or 35 W/cm$^2$, integration time: 10 ms). (a, b) Green and red channel images of a 1×1 $\mu m^2$ scan (pixel size: 50 nm, scale bar: 200 nm). The crosses indicate the fitted PSF centers. The image intensity profiles along the two lines are represented as bar graphs; the curve corresponds to the 2D elliptical Gaussian fit. Counts are higher in the green channel than in the red, but S/N ratios are comparable. (c) Overlay of the two channels. The dashed crosses indicate the centers of the PSFs. It is clear from the apparent width of the PSF (990 nm) that the beads are slightly out of focus. (d) Histograms of the fitted centers of 1000 bootstrap simulations of each channel. Each PD has a width of a few nanometers, corresponding to the uncertainty of the beads positions. Coordinates indicate absolute position (in nm) of the CLPS. These PDs are well fitted by 2D tilted Gaussians. The calculated distance is 75±9 nm (95% CL).

Figure 4:
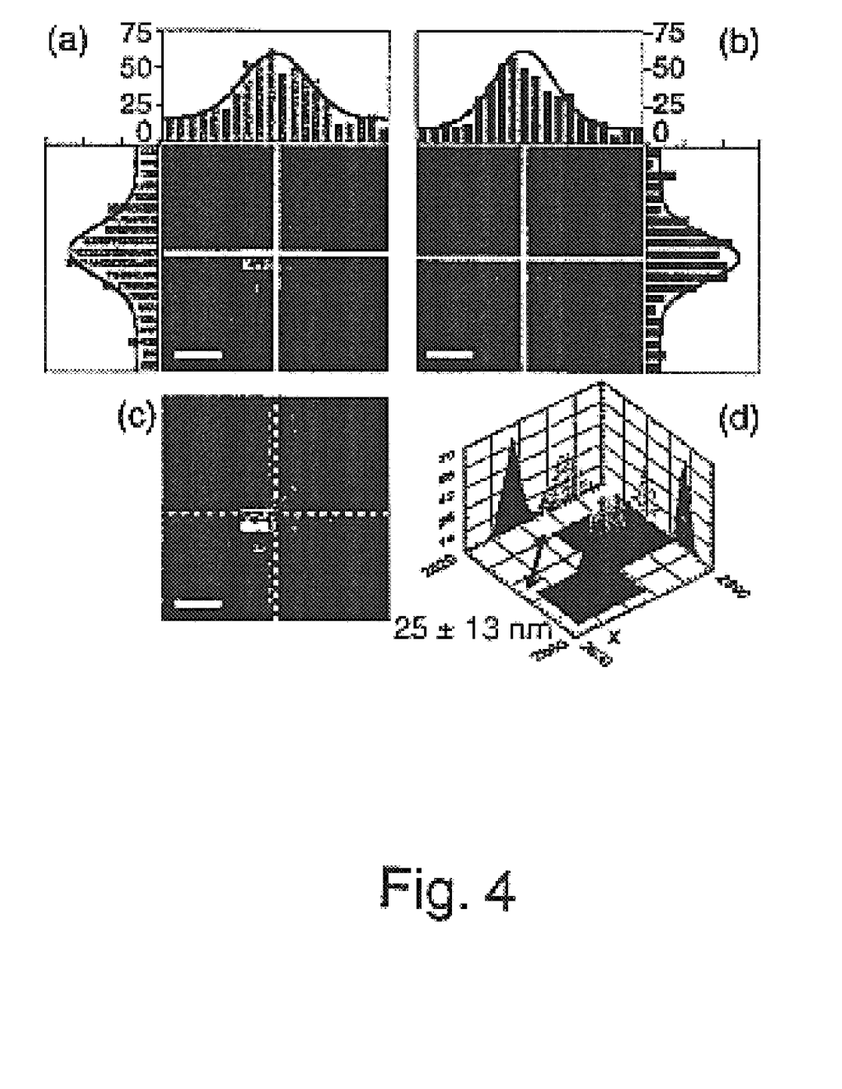
FIG. 4a and FIG. 4b are green and red channel images of a 1×1 $\mu m^2$ scan.
FIG. 4c is an overlay of two channels.
FIG. 4d is a histogram of the fitted centers for distribution.

FIG. 4 depicts non-blinking NC colocalization. Mixture of green (Em: 540 nm) and red (Em: 620 nm) NCs excited at 488 nm (excitation power: 200 nW or 140 W/cm$^2$, integration time: 50 ms). (a, b) Green and red channel images of a 1×1 $\mu m^2$ scan (pixel size: 50 nm, scale bar: 200 nm). See caption of FIG. 3 for a general description. In this case, the count rates are similar in both channels. (c) Overlay of the two channels. (d) Histograms of the fitted centers distribution. The measured distance is 25±13 nm (95% CL). The precision of the measurement is comparable to that obtained for beads (FIG. 3) due to negligible blinking.

Figure 5:
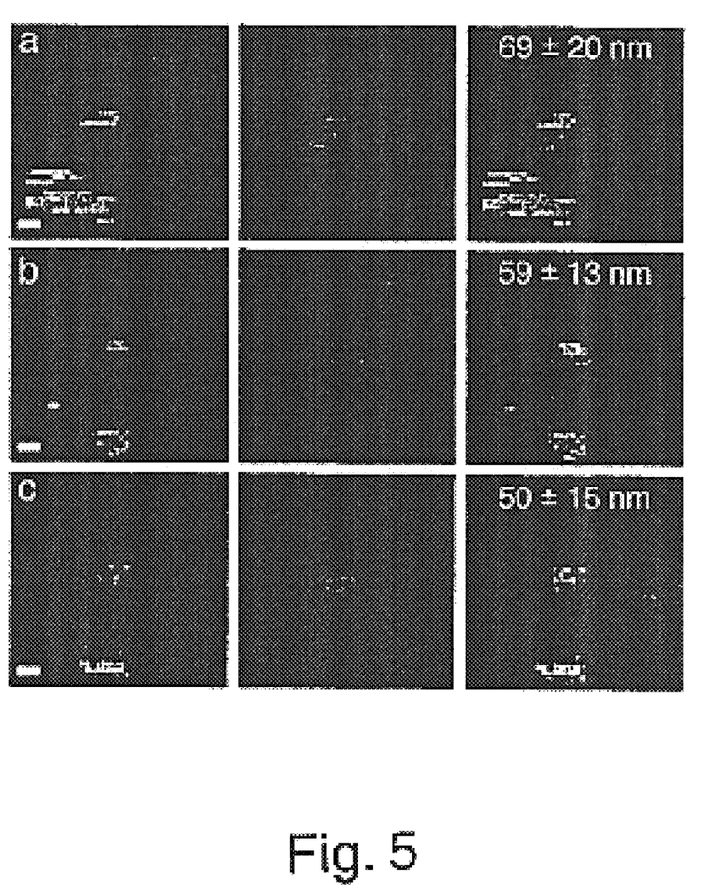
FIGS. 5a, 5b and 5c are blinking NC colocalization images.

FIG. 5 depicts blinking NC colocalization. There are the same mixture and parameters as in FIG. 4 (2×2 $\mu m^2$ field of view, scale bar: 200 nm). The same field of view was acquired repeatedly, with a 2 min interval corresponding to the duration of the scan. A slight drift can be observed between the first and second image. Measured distance±error bar (95% CL) are indicated on the dual-color images. One of the two green NCs in the lower left corner goes into a prolonged dark state in (b) and (c).

Sample Preparation.

Coverslips were treated with 1 M KOH in a sonicator for 30 min, rinsed in de-ionized water and dried under nitrogen flow. TSF: TRANSFLUOSPHERES (TM) 40 nm in diameter (Molecular Probes, excitation/emission peaks: 488/560 and 488/685 nm) were diluted in deionized water to $10^{-3}$ to $10^{-4}$ the stock concentration. A 10 $\mu$l drop containing a mixture of the two beads was left to dry on a coverslip in a dessicator and used immediately. NC: Different NC batches (ensemble peak emissions: 540, 575, 588 and 620 nm) were prepared as previously described (28, 29), mixed and diluted in butanol before use. We routinely synthesized NCs with full-width half-maximum (FWHM) ensemble spectrum of 30–40 nm. Each batch typically had ~5% variations in size as measured by transmission electron microscopy (28, 29). Sample preparation was identical to that of TSFs.

Optical excitation and scanning-stage setups.

Two custom confocal setups (FIG. 1a) using Argon laser sources (Melles Griot) and optical microscopes equipped with oil immersion Plan-Apochromat x100 (NA 1.4) objectives were used. Laser intensity (488 nm, linearly polarized) was recorded and feedback-controlled, ranging from 50 nW to 1 $\mu$W as measured in front of the dichroic beam splitter (505DRLP, Omega Filters—O.F.), or equivalently 35 W/cm$^2$ to 700 W/cm$^2$ within the first Airy disk. The first setup comprised an Axiovert S100TV inverted microscope (Zeiss) and an open-loop flat piezo-scanner (NIS-30, Nanonics). The second consisted of an Axioskop 50 upright microscope (Zeiss) and a closed-loop, 3-axis, piezo-scanning flexure stage equipped with capacitive sensors for position measurement (P-517.3CL, Physik Instrumente). The scanners were controlled by analog output boards (ATAO6, 12 bits and PCI 6111E, 16 bits, National Instruments—N.I.) and software written in C++ and LabVIEW (N.I.), respectively. Scanned areas ranged from 1×1 $\mu m^2$ to 10×10 $\mu m^2$, in steps of 25 nm to 100 nm, with integration times of 5 to 200 ms depending on the detector used. The CLPS was calibrated at the factory (1 nm accuracy); scanner positions were recorded during each acquisition using a 12 bits analog input board (PCI 6111E, N.I.).

Fluorescence detection.

Dual-color colocalization measurements (NCs and TFSs) were performed on the Axioskop (FIG. 1b). A dichroic mirror (565DRLP for NCs and 610DRLP for beads, O. F.) separated green and red wavelengths onto two avalanche photodiodes (APD, SPCM AQ141, EG&G), which simultaneously counted the photons on both channels. Band pass filters in front of each APD minimized cross-talk of both channels (535DF35 and 625DF25 for NCs, and 555DF25 and LP695 for TFSs, O. F.). Individual photon's arrival times were recorded with a time-counting board (PCI 6602, N.I.), and attributed online to each pixel of the dual-color image.

For multicolor colocalization work with more NCs, one costly option is to successively split the different colors by optical filters and use a large number of APDs. Instead, we designed a new apparatus (FIG. 1c) incorporating a custom single-prism spectrometer (fused silica isosceles Brewster prism with AR coating, CVI Laser Corporation) in the detection arm of the Axiovert. The dispersed (separated) photons were projected onto a Peltier-cooled intensified charged-coupled device (ICCD) camera (PentaMax, Princeton Instruments). A full spectrum was recorded for each image pixel in synchronization with the piezo-scanner movements. Calibration done with known laser lines showed a spectral resolution of 2 nm. Data acquisition was performed using Win View software (Princeton Instruments), with integration times ranging from 20 to 100 ms per pixel.

Data analysis.

Data analysis was performed with a set of custom software tools written in LabVIEW. For the Axioskop (FIG. 1b) two-color APD images were constructed by overlaying the two independent channels (17, 27). On the Axiovert (FIG. 1c), individual spectra of many single NCs were recorded as follows. In the first step, spectral bands (25 nm width) determined from ensemble emission spectra were used to generate images for each NC batch. From these images, the spectra of apparently colocalized NCs were determined (FIG. 2a) by integrating the ICCD data of a number of image pixels sufficient to cover the PSF area (e.g. 3×3 pixels for a 10×10 $\mu m^2$ scanning area). It was found that the FWHM of the emission spectrum of a single NC was only 15–25 nm. In the second step, narrower spectral bands (5–20 nm) were chosen to define new color channels (FIG. 2b) with reduced spectral overlaps (i.e. as 'orthogonal' as possible). This procedure also allows one to examine the spectral inhomogeneities of NCs within a single batch.

In the third step, the above images were combined into a composite false-color image with perfect registry between each color plane (FIG. 2c). These composite images obtained on the Axiovert setup (ICCD detection) are the multicolor equivalent of the dual-color images obtained on the Axioskop setup (APD detection). The final steps of the UHRC analysis were performed on dual-color images obtained with the Axioskop only, for it was the only one equipped with a CLPS.

Regions of interest (ROI) were then selected for further analysis. For each color plane of the ROI, a non-linear Levenberg-Marquard fit of the PSF to a 2D elliptical Gaussian (a good approximation of the theoretical pattern) was performed using $\chi^2$-minimization (30). Error bars on the coordinates of each PSF center were estimated using a bootstrap simulation method. For each image plane, 1000 modified data sets were constructed from the original image. Each modified data set consisted of 70% of the original pixel values, plus 30% of randomly picked values from the original data set (31). Each bootstrap simulated data set was then fitted to a 2D Gaussian using the $\chi^2$-minimization approach, leading to a slightly different fitted center for the PSF. As a result, we obtained a probability distribution (PD) for the position of each PSF's center, which was fitted by an elliptical 2D Gaussian. For each pair of colocalized centers, a distance PD was then computed analytically from these fitted center's coordinates PDs. The final step of the analysis consisted in extracting an error bar on the distance from this distance PD. We emphasize here that we report the 95% confidence limit (CL) error bar, whereas the literature more commonly reports the less stringent 68% CL error bar (which is typically twice smaller).

Because the $\chi^2$-minimization procedure is strictly valid only for functions with Gaussian distributed values, we numerically estimated the theoretical precision accessible by this approach, using simulated data both for bead and for blinking NC's PSF. Indeed, in the case of the shot-noise limited signal of beads (Poisson distributed values), the $\chi^2$-minimization approach is still justified for high-count-per-pixel (cpp) values. It is less so for the non-Poisson distributed data of blinking NCs (32–35). Simulations of NC blinking relied on a separate photophysical study, in which time trace measurements were performed and analyzed. We checked by simulations that the bootstrap estimation of the position PD of each PSF's center gave a correct estimation of the uncertainty of the PSF's center position. In addition, simulations incorporated the recorded CLPS position files to take into account the uncertainty coming from mechanical ringing and residual ground-loop noise.

The approach contemplated by the instant invention prefers the use of different fluorophores that can be excited with one source but emit at different, non-overlapping wavelengths. This requirement comes from the difficulty to obtain precise parfocality for two different wavelengths. That is a tough constraint if one wants to simultaneously colocalize more than two colors while maintaining comparable signals for all of them. Moreover, for high accuracy fitting, a significant number of pixels per PSF area is preferred, i.e. the fluorophores should not fade too quickly. To our knowledge, energy transfer dyes (36), TFSs and NCs are the only available probes to fulfill the first requirement for one-photon excitation. Because of photobleaching and cross-talk considerations, we chose to work with TFSs and NCs. Both have advantages and disadvantages for colocalization studies as discussed below.

TFSs are carboxylate-modified polystyrene beads loaded with a series of two or more dyes. Energy transfer between these dyes accomplishes large Stokes shifts so that only the longestwavelength dye exhibits significant fluorescence. We tested four types of TFSs (40 nm diameter) excited at 488 nm with emission peaks centered at 560, 605, 645 and 685 nm respectively (47 nm FWHM). In our dual-color analysis, we used the two extreme colors to minimize spectral overlap, i.e. the 560 and 685 nm beads. Although containing hundreds of dye molecules per bead, noticeable photobleaching was still observed for the 685 nm TFSs, although only after several minutes of continuous excitation. Incident laser excitation power was kept at 50 nW (35 W/cm$^2$), maintaining acceptable S/N and reasonable photostability during the acquisition of the image.

FIG. 3 gives an example of colocalization data obtained with TFSs for 50 nm pixels. The two separate color planes (FIGS. 3a and 3b) show very similar position for the slightly elliptical PSFs, but the composite image (FIG. 3c) exhibits a shift between the two: the measured distance between the two beads' centers is 75±9 nm. FIG. 3d shows the PD for each PSF coordinates as derived from the bootstrap calculations. Distance and error bar were extracted from the distance PD. The known asymmetry of the confocal excitation spot for high NA objectives and linear-polarized illumination (37), as well as imperfections of the optical components result in an elliptical cross-section for the PSF. However, since all objects are illuminated with the same PSF, potential elliptical deformations, or slight out-of-focus positions of the sample have no influence on the precision of the 2D distance measurement.

This result is typical of what we obtained with the TFSs at this excitation power and with this pixel size. The uncertainty is essentially due to the shot noise emission of the beads, and to the background noise level, as checked by numerical simulations. The green beads gave a maximum signal on the order of 400 cpp (integration time: 10 ms), whereas the red signal was lower than 100 cpp. However, the background signal was larger in the green channel (20 cpp) than in the red (5 cpp), resulting in similar S/N, and hence, similar uncertainties in the fit. In a few occasions, because of spectral inhomogeneity among beads (as was checked on green only samples), leakage of the green signal into the red channel was observed. To handle these cases, we implemented a two step fitting procedure: the first step consisted in the green PSF fit, and the second one in the simultaneous red PSF fit plus residual green PSF fit using the results of the first fit as a constraint for the position and width of this residual. Simulations showed that in these cases, the precision of the fitting procedure was identical to the more favorable and common cases where no leakage was observed.

NCs are small semiconductor nanocrystalline objects with diameters that can be fine-tuned from 2 to 10 nanometers. Their absorption-edge and emission peak scale with size due to quantum confinement. The emission wavelength can be tuned by means of material composition and NC size anywhere from the ultraviolet to the infrared (28). For the experiments described here, we used CdSe/ZnS NCs with emission peaks between 540 and 620 nm, and typical ensemble solution FWHM of 30 nm. NCs are brighter (depending on excitation conditions) than their organic dye counterparts, live longer, but suffer from intermittent fluorescence emission (resulting in "blinking") (31, 32, 34, 35). They exhibit dark states that can span any duration from microseconds to seconds, sometimes accompanied by intermittent spectral jumps. This photophysical behavior can result in a strong nonlinear relationship between the laser excitation power and the fluorescence emission.

When trying to map the excitation PSF with a NC, the outcome can be in the worst cases a patchy PSF image with no obvious relation between the excitation intensity and the integrated emission intensity. As a result, some PSFs appear as if the source bleached during the scanning, reducing the number of pixels for the fit, and more generally have an irregular shape that significantly reduces the precision of localization. However, since NCs can be synthesized in a larger number of well-separated colors, they are extremely attractive for applications that need multicolor detection, as illustrated in FIG. 2. In this work we present the limitations and optimal conditions for best colocalization work using the current generation of NCs. An example of data obtained with a mixture of four different NC colors using the multicolor scanning-stage confocal setup (FIGS. 1$a$ and 1$c$) is shown in FIG. 2. Although only four NC batches were used, spectral analysis of the sample revealed five distinct spectral peaks (the batch with nominal 620 nm peak showed a bimodal distribution) as indicated by different colors in FIG. 2$a$. Accordingly, five bands were defined (marked i through v) and five different false-color images were generated (FIG. 2$b$). Their overlay is shown in FIG. 2$c$.

FIG. 4 illustrates a simpler case of two different NC batches observed with the APD detection and closed-loop scanner setup. FIG. 4$a$ shows a ROI of 1×1 $\mu m^2$ (50 nm pixel size, 200 nW or 140 W/cm$^2$, 50 ms integration time), containing two NCs (540 and 620 nm) used for ultrahigh-resolution measurements. Due to minimal blinking during this scan, the distance measurement (25±13 nm, 95% CL) exhibits a precision similar to that of the TFSs.

FIG. 5 shows a more typical case, where the two NCs under study show different blinking pattern during successive scans of the same area. The indicated uncertainty is obtained by the bootstrap analysis for each individual image: (a) d=69±20 nm; (b) d=59±13 nm; (c) d=50±15 nm. All are compatible with an averaged distance of 59±28 nm. Since we can exclude individual motion of the adsorbed NCs on the dry surface, the discrepancies between the different estimations of the distance are an additional illustration of the larger uncertainty coming from blinking.

We tested the effect of NC intermittency on the precision of the PSF fit by numerical simulations. NCs were simulated assuming either an exponential or a power-law distribution of dark (off) and emitting (on) intervals, since both are experimentally observed (ref. (35) and our unpublished observations). As it is obvious from the distribution of distances obtained for a single pair of fixed NCs (FIG. 5), blinking notably degrades the reliability of distance measurements compared to TFSs. Attempting to impose a threshold to eliminate 'almost off' pixels did not significantly improve the precision of the fit. Other maximum-likelihood fitting methods might slightly improve the results, but in many cases of observed blinking patterns, they will also face similar limitations as the $\chi^2$-minimization method.

The data in FIGS. 3 and 5 illustrate advantages and limitations of TFSs vs. NCs. As discussed in the literature (38), and as verified by our numerical simulations, the precision in both cases is affected by three factors: shot noise (related to the cpp level), S/N, and the number of pixels containing information on the PSF. The number of pixels is easily increased by reducing the piezo-scanner step size. We arbitrarily limited pixel size to 50 nm resulting in 95% CL error bars of about 10 nm. Smaller step sizes could of course be used to attain higher resolution. However, it is of doubtful utility to increase the localization accuracy of objects having diameters much larger than 10 nm like beads, which will be used to report the presence of non-fluorescent molecules (e.g. proteins). Indeed, distance is extracted from the positions of the beads themselves, not from the unknown position of the molecules of interest attached to the beads' surface. Hence, in this approach, resolution is limited by the size of the reporter and not by the pixel size.

Concerning the shot noise and S/N, in the case of beads, high cpp and large S/N can be easily obtained with a relatively limited excitation power while keeping integration time reasonably short. In the case of single NCs, longer integration times do not suppress the non-linearity coming from blinking, and increased excitation power leads to saturation. As discussed, different maximum-likelihood fitting algorithms might reduce uncertainties, but suppression of blinking (e.g. by using few NCs clustered in polystyrene beads) would be preferable.

Our results demonstrate that UHRC of fluorophores is possible from the FRET distance range (a few nanometers) to arbitrarily large distances (many microns) provided that the following four criteria are fulfilled: (i) the fluorophores can be excited with a single wavelength; (ii) their emission properties allow an unambiguous distinction between the different types. Here, we used differences in the emission spectra, but other parameters like fluorescence lifetime could also be used; (iii) they are bright enough and provide a reasonable S/N over a sufficient number of pixels of the PSF; (iv) a CLPS is used. In order to extend the range of applications of this approach, we are investigating the use of two-photon excitation to access a larger variety of fluorescent probes like single dye molecules, or smaller beads loaded with single fluorescent species. Our results call for improvements in at least two directions: (1) faster data acquisition requires higher quantum yield of the fluorophores or equivalently, (2) higher sensitivity of the detector.

Theoretical studies of NC photophysics predict reduced intermittency for various engineered band-gaps (39); future investigations will focus on such improvements. On the detector side, use of an array of APDs instead of an ICCD camera should reduce the integration time to the millisecond range. If TFSs or nanobeads containing several NCs were used, the acquisition of a multicolor image of a 10×10 $\mu m^2$ area with 10 nm localization resolution would be feasible in about two minutes. We point out that the use of a CLPS allows one to first acquire a lowresolution multicolor imaging of the sample, before zooming-in on a ROI for UHRC measurements. Improvements in speed and feedback-loop control of the mechanical and thermal drift of the sample stage will allow the extension of this work to three dimensions. 3D multicolor colocalization will also entail a detailed characterization of the volume shape of the PSF, which is very sensitive to the thickness and index of refraction of the coverslip, as well as to the indices of the physiological buffer/embedding matrix and the immersion oil (40, 41).

In spite of current limitations, immediate applications to biology can be envisioned. Functionalized TFSs and NCs will allow ultrahigh-resolution mapping of genes and DNA binding proteins. In conjunction with time-gated detection of NCs that drastically reduces autofluorescence (42), one can envision a dynamic, multicolor, 3D, nanometer-accuracy colocalization methodology used to follow proteins, nucleic acids, molecular machines and assemblies, and organelles within the living cell.

The invention contemplated herein utitilizes detectors known to those of ordinary skill in the art. These include analog and digital technology. Illustrative, but not exaustive examples include point detectors such as avalanche photodiodes of 2D detectors such as charge-coupled devide camera (ICCD camera). Also photomultiplier tubes, linear detectors such as avalanche photodiode linear array or photomultiplier tube linear arrays and 2D detectors such as avalanche photodiode 2D array or position-sensitive single-photon detectors.

It will be appreciated by those skilled in the art that various modifications and extrapolations can be made in the process and article as described herein without departing from the spirit and scope of the invention.

We claim:

1. A method for the colocalization of two or more species of interest in a sample comprising:
    a) exciting the species of interest with a single wavelength of light thereby causing the two or more species of interest to emit light of a distinctive emission characteristic,
    b) separating the distinctive emission characteristics of the two or more species of interest,
    c) detecting the emitted light from the two or more species of interest,
    d) moving the sample a predetermined distance,
    e) repeating steps a) through d) a predetermined number of times thereby creating a multitude of representations of the excitation point spread function (PSF),
    f) determine the geometric center of the representations of the excitation PSF for at least two species of the two or more species of interest,
    g) computing the distance between the geometric centers of the representations of the excitation PSF for the species of interest.

2. The method of claim 1, where the detection of the emitted light from the two or more species is accomplished either simultaneously or sequentially.

3. The method of claim 1, where the detection of the emitted light from the two or more species is accomplished simultaneously.

4. The method of claim 1, where the excitation of the species of interest is accomplished using a laser.

5. The method of claim 4, where the excitation of the species is a single photon process.

6. The method of claim 4, where the excitation of the species is a multiphoton process.

7. The method of claim 1, where the predetermined distance the sample is moved is a distance of from about 1 angstrom up to a distance of about 10 microns.

8. The method of claim 7, where the predetermined distance the sample is moved is about 25 nm.

9. The method of claim 1, where the emitted light is detected using one or more photodiodes or a photodiode array.

10. The method of claim 1, where the emitted light is detected using an ICCD or charge coupled device.

11. The method of claim 1, where separation is accomplished either by spectrum, polarization or lifetime.

12. The method of claim 1, where the separation is accomplished by spectrum.

13. The method of claim 1, where the determination of the geometric center of the representations of the excitation PSF for at least two of the species of interest is accomplished using an algorithm.

14. The method of claim 1, where the at least two species of interest comprise at least two fluorophores capable of being excited at the same wavelength.

15. The method of claim 1, where the at least two species of interest comprise at least two fluorophores which emit light at different wavelengths.

16. The method of claim 1, where the emitted light is directed through a confocal pinhole.

17. The method of claim 1, where the at least two species of interest comprise at least two fluorophores which emit light with different lifetimes.

18. The method of claim 1, where the emitted light is detected with digital technology or analog technology.

19. The method of claim 1, where the separation is based on a photophysical characteristic.

20. The method of claim 1, where the at least two species of interest comprise at least two fluorophores which emit light with different polarizations.

21. The method of claim 4, where the laser is a pulsed laser.

22. The method of claim 1, where the separation is based on differences in fluorescence lifetime.

23. The method of claim 1, where the sample is moved three dimensionally.

24. The method of claim 1, where the sample is moved two dimensionally.

25. The method of claim 1, where the emitted light is detected using a point detector.

26. The apparatus of claim 21, where the device capable of detecting the emitted light is a point detector.

* * * * *